US008607314B2

(12) United States Patent
Barrett (10) Patent No.: US 8,607,314 B2
(45) Date of Patent: *Dec. 10, 2013

(54) METHOD AND SYSTEM FOR TRANSMITTING AUTHENTICATION CONTEXT INFORMATION

(75) Inventor: Michael Richard Barrett, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/420,469

(22) Filed: Mar. 14, 2012

(65) Prior Publication Data

US 2012/0180118 A1 Jul. 12, 2012

Related U.S. Application Data

(63) Continuation of application No. 12/797,531, filed on Jun. 9, 2010, now Pat. No. 8,181,231, which is a continuation of application No. 11/673,366, filed on Feb. 9, 2007, now Pat. No. 7,761,909, which is a continuation of application No. 10/334,270, filed on Dec. 31, 2002, now Pat. No. 7,207,058.

(51) Int. Cl.
*G06F 21/00* (2013.01)
*G06F 7/04* (2006.01)

(52) U.S. Cl.
USPC .............. 726/4; 713/182; 713/183; 713/184; 713/185; 713/186; 726/26

(58) Field of Classification Search
None
See application file for complete search history.

(56) References Cited

U.S. PATENT DOCUMENTS

| | | |
|---|---|---|
| 5,544,322 A | 8/1996 | Cheng et al. |
| 5,684,950 A | 11/1997 | Dare et al. |
| 5,784,566 A | 7/1998 | Viavant et al. |
| 5,841,970 A | 11/1998 | Tabuki |
| 5,930,804 A | 7/1999 | Yu et al. |
| 6,044,155 A | 3/2000 | Thomlinson et al. |
| 6,055,575 A | 4/2000 | Paulsen et al. |
| 6,055,637 A | 4/2000 | Hudson et al. |
| 6,105,132 A | 8/2000 | Fritch et al. |

(Continued)

OTHER PUBLICATIONS

Denning, et al., "Location-Based Authentication: Grounding Cyberspace for Better Security", pp. 12-16, Computer Fraud & Security, Feb. 1996.*

(Continued)

*Primary Examiner* — William Powers
(74) *Attorney, Agent, or Firm* — Snell & Wilmer L.L.P.

(57) ABSTRACT

A system of the present invention uses an identity provider to provide the authentication services for multiple service providers. An identity provider communicates with one or more service providers. A user that wishes to gain access to a service provider is authenticated through the use of the identity provider. A user desiring to access a service provider is first authenticated by the identity provider. The identity provider determines if the user meets the desired class level and provides various information related to the authentication. When the user attempts to access a second service provider that is associated with the same identity provider, the second service provider accesses the identity provider and determines that the user was recently authenticated. The identity provider then transmits the relevant information regarding the authentication process to the second service provider, which can then allow or deny the user access to the second service provider.

18 Claims, 3 Drawing Sheets

(56) References Cited

U.S. PATENT DOCUMENTS

| | | | |
|---|---|---|---|
| 6,108,583 | A | 8/2000 | Schneck et al. |
| 6,216,231 | B1 | 4/2001 | Stubblebine |
| 6,226,752 | B1 | 5/2001 | Gupta et al. |
| 6,256,741 | B1 | 7/2001 | Stubblebine |
| 6,263,447 | B1 | 7/2001 | French et al. |
| 6,272,631 | B1 | 8/2001 | Thomlinson et al. |
| 6,275,941 | B1 | 8/2001 | Saito et al. |
| 6,408,336 | B1 | 6/2002 | Schneider et al. |
| 6,496,936 | B1 | 12/2002 | French et al. |
| 6,505,300 | B2 | 1/2003 | Chan et al. |
| 6,510,236 | B1 * | 1/2003 | Crane et al. ............. 382/116 |
| 6,584,505 | B1 | 6/2003 | Howard et al. |
| 6,601,065 | B1 | 7/2003 | Nelson et al. |
| 6,615,264 | B1 | 9/2003 | Stoltz et al. |
| 6,615,356 | B1 * | 9/2003 | Byun ..................... 726/36 |
| 6,857,073 | B2 | 2/2005 | French et al. |
| 2002/0023220 | A1 | 2/2002 | Kaplan |
| 2002/0026575 | A1 | 2/2002 | Wheeler et al. |
| 2002/0087858 | A1 | 7/2002 | Oliver et al. |
| 2002/0107792 | A1 | 8/2002 | Anderson |
| 2002/0112171 | A1 | 8/2002 | Ginter et al. |
| 2002/0152376 | A1 | 10/2002 | Eigeles |
| 2002/0152394 | A1 | 10/2002 | Kadoya |
| 2002/0178354 | A1 | 11/2002 | Ogg et al. |
| 2002/0184444 | A1 | 12/2002 | Shandony |
| 2003/0051134 | A1 | 3/2003 | Gupta |
| 2003/0115142 | A1 * | 6/2003 | Brickell et al. ............. 705/51 |

OTHER PUBLICATIONS

USPTO; Office Action dated Jun. 17, 2004 for U.S. Appl. No. 10/334,270.
USPTO; Office Action dated Jan. 13, 2005 for U.S. Appl. No. 10/334,270.
USPTO; Final Office Action dated May 27, 2005 for U.S. Appl. No. 10/334,270.
USPTO; Advisory Action dated Aug. 9, 2005 for U.S. Appl. No. 10/334,270.
USPTO; Office Action dated Sep. 20, 2005 for U.S. Appl. No. 10/334,270.
USPTO; Office Action dated Mar. 15, 2006 for U.S. Appl. No. 10/334,270.
USPTO; Final Office Action dated Aug. 30, 2006 for U.S. Appl. No. 10/334,270.
USPTO; Advisory Action dated Nov. 13, 2006 for U.S. Appl. No. 10/334,270.
USPTO; Notice of Allowance dated Jan. 31, 2007 for U.S. Appl. No. 10/334,270.
USPTO; Office Action dated Sep. 14, 2009 for U.S. Appl. No. 11/673,366.
USPTO; Final Office Action dated Dec. 28, 2009 for U.S. Appl. No. 11/673,366.
USPTO; Notice of Allowance dated Mar. 10, 2010 for U.S. Appl. No. 11/673,366.
PCT; Int'l Search Report and Written Opinion dated Jul. 22, 2004 for PCT/US2003/039926.
PCT; Written Opinion dated Mar. 18, 2005 for PCT/US2003/039926.
USPTO; Office Action dated Aug. 19, 2011 for U.S. Appl. No. 12/797,531.
USPTO; Final Office Action dated Dec. 1, 2011 for U.S. Appl. No. 12/797,531.
USPTO; Notice of Allowance dated Dec. 19, 2011 for U.S. Appl. No. 12/797,531.

* cited by examiner

METHOD AND SYSTEM FOR TRANSMITTING AUTHENTICATION CONTEXT INFORMATION

CROSS REFERENCE TO RELATED APPLICATIONS

This application is a continuation of, and claims priority to, U.S. patent application Ser. No. 12/797,531 filed on Jun. 9, 2010 and entitled "METHOD AND SYSTEM FOR TRANSMITTING AUTHENTICATION CONTEXT INFORMATION" The '531 application is a continuation of, and claims priority to, U.S. Pat. No. 7,761,909 issued on Jul. 20, 2010 (aka U.S. patent application Ser. No. 11/673,366 filed on Feb. 9, 2007) and entitled "METHOD AND SYSTEM FOR TRANSMITTING AUTHENTICATION CONTEXT INFORMATION.," The '909 patent is a continuation of, and claims priority to, U.S. Pat. No. 7,207,058 entitled "METHOD AND SYSTEM FOR TRANSMITTING AUTHENTICATION CONTEXT INFORMATION," issued on Apr. 17, 2007 (aka U.S. patent application Ser. No. 10/334,270 filed on Dec. 31, 2002). All of which are incorporated herein by reference.

FIELD OF INVENTION

This application generally relates to exchanging information among computer systems, and more particularly, to a method and system for exchanging authentication context information among various computers.

BACKGROUND OF THE INVENTION

Computer systems are often interconnected in various ways. For example, a computer may be connected to the Internet in order to remotely access various systems to accomplish certain tasks, such as managing an account, purchasing goods or services, communicating with others and/or the like. In certain instances, it is desirable for a user to be uniquely identified, for various reasons. For example, a user may wish to have customized news information displayed via a web browser; a user may wish to interact with other users while being identified such as on a message hoard; and/or a user may wish to access sensitive information, such as an on-line e-mail account, financial data, and/or the like.

Currently, many remote service providers, such as those using the Internet, utilize a log-in procedure that may require, for example, that a user first registers with a particular service provider, provide or get assigned a unique identifier and password, and use the unique. ID and password with each access to the particular system. However, with the proliferation of services available via the Internet, it may become cumbersome for a user to provide a different ID and password for each system the user wishes to access. As such, the user may be tempted to use a less secure ID and password (such as readily identifiable characteristics), or decide not to use a particular service provider at all.

It may be desirable to provide an easier method for a user to access various systems. One such method may utilize a single log-in that is applicable for multiple sites. For example, once a user logs in to one application (for example, an application to access his brokerage account), that log-in data may be stored and used again when the user wishes to access his bank account. Thus, when the user accesses his bank account, there is no need to separately log-in to the bank account, as the bank account program is able to use the previous log-in information. Moreover, even if the bank account and brokerage account are with unrelated entities, the user need only use one log-in procedure.

A need exists to standardize the procedure by which a user is authenticated. More particularly, it is desirable that the criteria used to authenticate a user be made available to the various service providers, such that the service provider can be assured that an authentication is at a sufficient security level (e.g., the level of authentication needed to allow a user to post messages on a message board is likely to be lower than the level of authentication needed to allow a user to perform financial transactions.)

SUMMARY OF THE INVENTION

A system of the present invention uses an "identity provider" to facilitate authentication services for multiple service providers. Each identity provider communicates with one or more service providers such that a user that wishes to gain access to a service provider is authenticated through the use of the identity provider.

A method of the present invention involves a user accessing a first service provider wherein the service provider is configured to use an identity provider to authenticate the user to determine if the user is properly authorized to use the service provider. The identity provider analyzes the user and provides the authentication information to the service provider, which can then allow or deny the user access to the first service provider. Thereafter, when the user attempts to access a second service provider that is associated with the same identity provider, the second service provider accesses the identity provider and determines that the user was recently authenticated. The identity provider then sends the relevant information regarding the authentication process to the second service provider, which can then allow or deny the user access to the second service provider's services. In the event that the level of authentication was not at a sufficient level, the second service provider may allow the identity provider to authenticate the user with a higher degree of certainty.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

Figure 1:
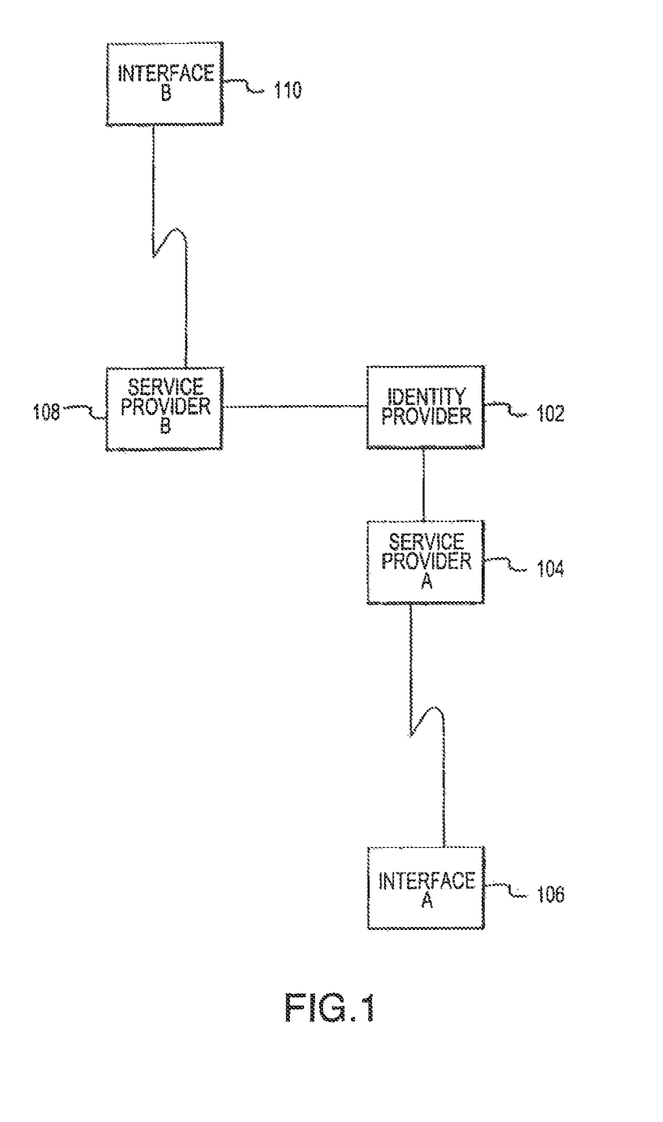
FIG. 1 presents a block diagram overview of an exemplary system of the present invention.

In general, the present invention includes an "identity provider" to facilitate authentication services for multiple service providers. In one embodiment, each identity provider is suitably coupled to one or more service providers such that a user that wishes to gain access to a service provider is authenticated through the use of the identity provider. One method to facilitate such a single log-in system is to utilize an identity provider. With reference to FIG. 1, a user may be able to use by Interface A (106) to access Service Provider A (104) and may later wish to use Interface B (110) to access Service Provider B (108). It should be understood that both interface 106 and by Interface 110 may take one of many different forms, such as a web interface. Service Providers 104 and 108 may provide various types of services, including, but not limited to, financial services, access to various computer systems, and/or the like.

Each of service provider 104, service provider 108, and identity provider 102 may be embodied as computers. The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI) extensible markup language (XML), dynamic HTML, cascading style sheets (CSS), helper applications, plug-ins, and the like.

In a prior art configuration, a user would typically be required to submit a means of authentication (such as an ID and password) at by Interface 106. The authentication information would typically be processed by Service Provider 104. The user would then usually provide authentication information at by Interface 110, which would be processed by Service Provider 108.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the Internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (199), LOSHIN, TCP/IP CLEARLY EXPLAINED (1997). All of these texts are hereby incorporated by reference.

In an embodiment of the present invention, identity provider 102 is configured to issue an ID to a user. In a typical situation, when a user accesses a service provider and wishes to obtain an ID, the user is sent to the identity provider to complete a sign-up process to obtain an ID. In the alternative, identity providers may be available to provide IDs to users who wish to obtain them. In such a situation, a user would typically be aware of what service providers the identity provider is associated with before attempting to obtain the ID.

Identity provider 102 may issue information to the user or obtain information from the user in order to authenticate the user and associate the user with an ID. For example, an ID may be associated with a password (either issued by Identity provider 102 or by the User); with unique information associated with the User (such as an account number, date of birth, mother's maiden name, or other such information that may be readily known to the User but more difficult to obtain by an unauthorized person); with biometric credentials (such as a retina or fingerprint scan); with information possessed by the user (such as a smart card or magnetic striped card); and/or the like. For each of the situations described above, identity provider 102 saves the relevant information in a way such that the ID is associated the password, unique information, or biometric credentials. For example, a look-up table or database system may be used, where the ID is stored in one field and the password, unique information, or biometric credentials is stored in another field. In addition, information identifying the user is typically stored in the same manner.

The unique information stored in the look-up table or database may require that the user have access to various hardware. For example, a retinal scan machine may be necessary to scan the retina and convert the information to a digital format. Such a retinal scan machine may be coupled to a computing system used by the user in obtaining the ID. Other hardware that could be used include smart card readers, magnetic card readers, fingerprint readers, facial recognition systems and the like. Each such system is typically configured to convert some sort of data into a form readable by the computer systems.

Database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like.

In an embodiment of the present invention, after such an initial granting of an ID and associating the ID to the User, a User can access various service providers. In one embodiment, when attempting to access a service provider, the service provider re-directs the user to the identity provider. In a web embodiment, a pop-up window, a frame, or the like may be used to display the information from the identity provider. A user provides his information (such as ID and password, unique information, biometric information, etc.) at by Interface 106. Service provider 104 may provide a connection to identity provider 102, but not be made aware of the information being transmitted between the user and identity provider 102. Identity Provider 102 verifies the authentication information and sends the appropriate information back to the Service Provider 104. Such information may indicate whether the identity of the user has been verified. If verified, Service Provider 104 allows the user to access various information which the user is entitled to access.

However, different service providers may desire different levels of authentication. For example, a service provider that allows users to post messages to a message board may require less authentication than a service provider that allows users to transfer funds among various equities or bank accounts. Certain authentications may incorporate a user-chosen ID and password. More secure authentication methods may use a server-authenticated Secure Sockets Layer ("SSL") session. Thus, providing information regarding how a user was authenticated can be important.

The process by which the user is authenticated may be very important to the service providers 104 and 108. In one embodiment, identity provider 102 supplies various information indicative of the various methods and information used to facilitate authentication of the user. Such information may include the method used to authenticate the user, the security protocols used and/or the like. In one embodiment of the present invention, a set of criteria is created that defines a list of characteristics used by identity provider 102 to verify the user. The list of characteristics includes the following:

Identification—characteristics that describe the processes and mechanism identity provider 102 uses to initially create an association between a User and the ID by which the User will be known by the identity provider.

Physical Protection—Characteristics that specify physical controls on the facility housing the identity provider's (102) systems (e.g., site location and construction, access controls and the like), Operational Protection—Characteristics that describe procedural security controls employed by identity provider 102.

Technical Protection—Characteristics that describe how the secret (the knowledge or possession of which allows the User to authenticate to the identity provider) is kept secure.

Authentication Method—Characteristics that define the mechanisms by which the User authenticates his identity to identity provider 102 (for example, does the User supply a password or does he supply a fingerprint, etc.)

A class is a set of characteristics that are deemed acceptable by a service provider. For example, multiple, varying and/or different authentication statements may satisfy the requirements for a particular service provider with respect to particular users. If the method of authenticating the User is too low, it can be alleviated by the use of more secure operational protection or technical protection.

By introducing a layer of classes and defining a list of representative acceptable classes, the process by which identity provider 102 communicates with service providers 104 and 108 may be standardized and various service providers may standardize on what is an acceptable authentication based on the services being provided by the service provider. For example, a service provider may define a class that it considers acceptable for use by an identity provider. Thereafter, when identity provider 102 provides authentication services for that particular service provider, the authentication services can be provided at an acceptable security level.

This definition of acceptable authentication parameters may allow a particular identity provider to provide an authentication of the user that is of the appropriate certainty. In addition, the process by which service providers can indicate preferences when requesting a "step-up" authentication assertion (enhanced authentication) from identity provider 102 can be pre-established. Furthermore, Identity providers can provide a list of their capabilities in a standardized format, such as Web Service Definition Language ("WSDL"), which allows service providers to select an appropriate identity provider based on its authentication needs (for example, service providers that act as message boards may need a less secure method of authenticating users than a financial services provider). Moreover, various identity providers can provide a list of its capabilities such that a message board may not be likely to use the same identity provider as a brokerage firm, but a brokerage firm may use the same identity provider as a banking firm.

Authentication quality refers to the level of assurance that a service provider can place in an authentication assertion it receives from identity provider 102. A service provider can make a request to identity provider 102 as to the level of authentication or the authentication method desired. For example, the level of authentication required to post a message may be less than the authentication required to view an account balance, which may, in turn, require less authentication than transfers of funds, in addition, there may be configurations in which a service provider requires more authentication when processing small amounts of money than when processing large (e.g., more than $100,000) amounts of money.

In an embodiment of the present invention, there are 4 levels of authentication quality: 1) a match on a particular authentication context statement; 2) a match within a specific authentication context class; 3) a match or better on a particular authentication context class; and 4) a match within an ordered list (which is designated by the service provider) of authentication context classes.

Option 1 is used in the instance where identity provider 102 and the requesting service provider have previously agreed on the details of a particular authentication context that either does not fall into one of the previously defined classes or needs to be constrained more tightly.

Option 2 is the typical scenario and may be selected as the default. A service provider will often want an authentication that meets a certain level of security, as defined by a specific authentication context class.

Option 3 allows identity provider 102 to decide the best method of authentication to be used. A user that is authenticated at what is predetermined to be a higher level of certainty may likely be authenticated by a service that only requests a specific, lower level of authentication.

Option 4 provides greater control to the service provider over the authentication context classes to which the authentication assertions it receives conform to.

Identity provider 102 returns an authentication assertion to the service provider, indicating the authentication context class to which the user surpassed. The authentication assertion may be in the same class as requested, or may be in a different class (which may result in a rejection of the user by the service provider if the class is determined to be less secure lower than the requested class.) The returned authentication context includes a URL specifying the associated authentication context statement.

The authentication statement that is transmitted between identity provider 102 and the service provider may be in a various number of different forms. In one embodiment of the present invention, an eXtensible Markup Language ("XML") schema is predefined and the above-listed information is transmitted using the pre-defined XML schema. In one embodiment, there are several fields of information that are transmitted between identity provider 102 and the service provider. There may be a header field which contains various preliminary information, such as the name of the Identity Provider, the public key of the Identity provider, version information, and the like.

If the authentication is established by something that the user knows, various fields of information may be transmitted using the predefined XML schema. For example, the number of items used to establish identification. There may be one item used to establish the identity of the user (such as an account number), two items (such as a user ID and password), three or more items (user ID, password, and one or more separate identifiers (such as account number, date of birth, maiden name, query/response pair, etc.)). In the instance where a password is used, information regarding the password may be transmitted as well. For example, the number possible password combinations available under the authentication system may be transmitted. (For example, a system utilizing 4 numeric digits as a password has only 10,000 possible combinations, while a system using a 12-place alphanumeric phrase as a password has over $7 \times 10^{38}$ possible combinations.) In addition, information regarding whether or not the password expires, periodically, lockout controls for multiple failed authentication, etc. may be included in the XML schema also.

In one embodiment, if authentication of the user takes place via something the user possesses, the method of authentication is transmitted between the identity provider and the user provider. Possible exemplary authentications of this type include the use of a smart card, the swiping of a magnetic card, digital signature, and the like. In one embodiment, if authentication of the user takes place via something the user is, the method of authentication is transmitted between the identity provider and the user provider. Examples of this type of authentication include fingerprint key, retina scans, and facial recognition.

Along with the above-listed authentication information, various other information may also be provided by the identity provider. For example, the date/time of the authentication event, the date/time of the previous authentication event for the user, the date/time of the creation of the user account, the IP address of the user, and/or the like.

Figure 2:
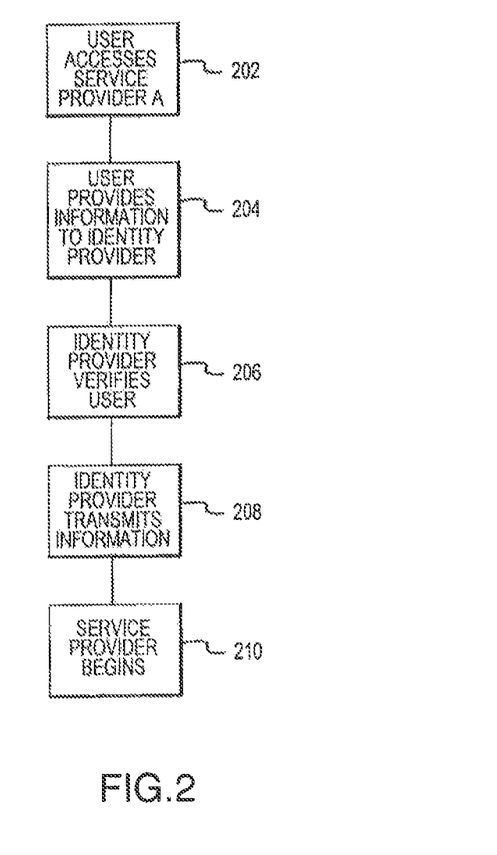
FIG. 2 is a flow chart illustrating an exemplary procedure used to authenticate a user.

With reference to FIG. 2, a flow chart illustrating an exemplary operation of an embodiment of the invention will be described. A user initially attempts to access a first service provider A (step 202), wherein service provider A uses an identity provider to authenticate the user. In a typical situation a relationship between service provider A and the identity provider is pre-established. The user provides information to the identity provider (step 204). For example, the user may be required to provide a PIN, a user ID, a password, a biometric identifier, and/or the like, in order to assert, to the satisfaction of the identity provider, that the User is who he says he is. The information may be supplied to the identification provider in a number of ways. For example, the user may be linked directly to the identity provider, where the user provides the necessary information. In another embodiment, the user may submit the information to the service provider, which then forwards the information to the identity provider. If the user does not have a pre-existing relationship with the identity provider, the user may then establish an identity, as described above with respect to FIG. 1.

In the situation where the user has previously submitted information to the identity provider, the identity provider then compares the submitted information with its previously stored records in order to verify the identity of the User (step 206). The identity provider then transmits the results of its authentication process to the service provider (step 208). The results of the authentication process includes whether or not the user was authenticated and, as described above, the various criteria used to authenticate the user. After the user is properly authenticated, the service provider may request additional information, provide information and/or begin to provide its services (e.g., message board login, travel reservations, email functions, account maintenance, etc.).

Figure 3:
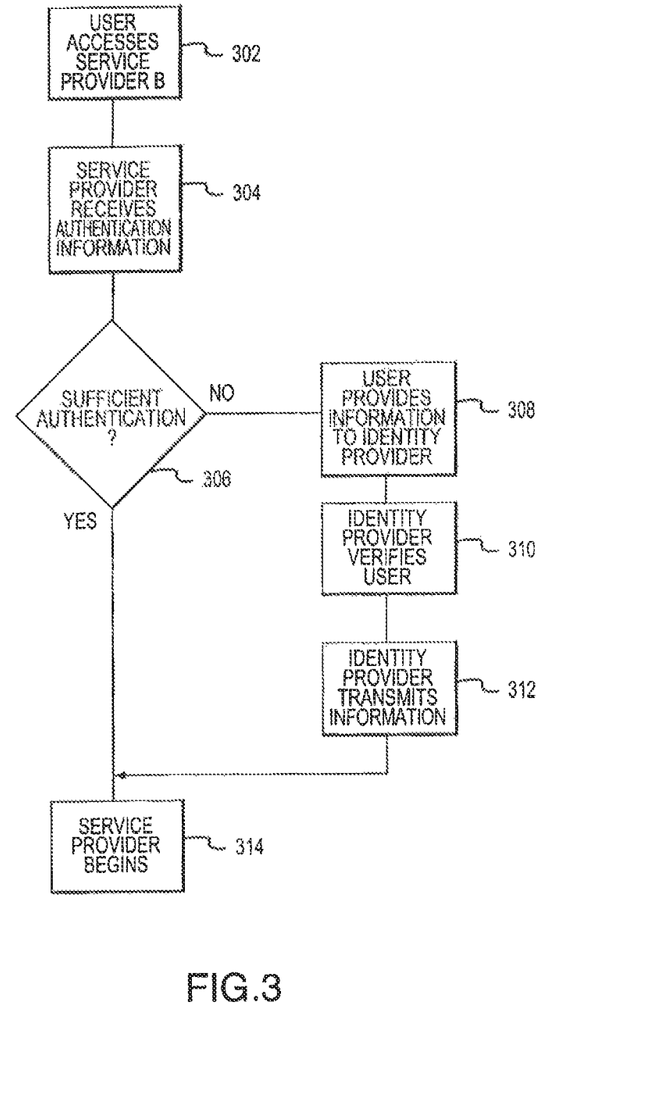
FIG. 3 is a flow chart illustrating an exemplary procedure used when a user was recently authenticated.

Thereafter, with reference to FIG. 3, when a user attempts to access a second service provider B, the process is simplified. For example, a User attempts to access a second service provider B (step 302). When service provider B contacts the identity provider, the identity provider can determine whether the user was recently authenticated when accessing service provider B. The time frame for being considered is adjustable but it typically less than 1 hour. Thereafter, service provider B exchanges information with the identity provider, including the results of the previous authentication and the various criteria used to authenticate the user (step 304). The previous authentication and associated criteria are next evaluated by the service provider (step 306). If the previous authentication meets the predetermined class for the service provider, service provider B can begin to supply its services (step 314), if the previous authentication does not meet the criteria of the class, the user may be re-authenticated at another (presumably more secure) class. This is accomplished by the user providing additional information to the identity provider (step 308), the identify provider verifying the identity of the user (step 310), and the identity provider transmitting the results of the authentication along the with various criteria used to authenticate the user (step 312). Such steps can be accomplished in a manner similar to those described above with respect to FIG. 1.

With respect to both FIG. 2 and FIG. 3, it should be understood that, should the user fail to properly authenticate with the identity provider, such information is transmitted to the service provider, such that the service provider may be configured to prevent the user from beginning a session with the service provider.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical."

I claim:

1. A method comprising:
   transmitting, by a first computer system for facilitating authentication of a user, authentication information of said user from said first computer system to a class-based second computer system,
   wherein said authentication information includes at least one of environment information and facility housing information related to said first computer system,
   wherein said environment information comprises at least one of characteristics of a process used to initially associate user credentials to said user, characteristics of a process used to verify an identity of said user, and characteristics of a methodology by which a secret is secured, and
   wherein said facility housing information comprises at least one of characteristics of physical controls of a facility housing said first computer and characteristics of procedural security controls of said first computer, and
   wherein said class-based second computer system provides services in response to said authentication information substantially complying with a predetermined class stored at said class-based second computer system, and wherein said predetermined class is defined by a service provider.

2. The method of claim 1, further comprising receiving, at said first computer system, information indicative of said identity of said user.

3. The method of claim 1, further comprising authenticating, by said first computer system, said identity of said user.

4. The method of claim 1, wherein said authentication information further comprises at least one of: data identifying said first computer, and data identifying previous verifications of said user.

5. The method of claim 1, wherein a request from said class-based second computer system to said first computer system for additional authentication credentials is in response to determining that said authentication information does not substantially comply with said predetermined class.

6. The method of claim 1, wherein said class is at least one of: indicative of information used in authenticating said user, contains data regarding the method of authentication used in performing said authenticating of said user, and contains data regarding security characteristics of said first computing system.

7. The method of claim 1, further comprising:
   providing data regarding authenticating said user from said first computer system to a third computer system, wherein said user attempts to access said third computer system, coupled to said first computer system, wherein said third computer system determines that said user was authenticated by said first computer system, and wherein said third computer system provides services in response to said authentication information substantially complying with said predetermined class stored by said third computer system.

8. The method of claim 7, wherein, in response to said third computer rejecting access to said third computing system in response to said authentication information not complying with said predetermined class, and in response to submitting additional information indicative of the identity of said user to said first computer system, said first computer system authenticates said identity of said user and transmits data regarding said authenticating to said third computer system, wherein in response, said third computer system provides services, in response to said data complying with said predetermined class.

9. The method of claim 1, wherein said authentication information is transmitted using a predetermined XML schema.

10. The method of claim 1, wherein said class-based second computer system transmits a request to said first computer system for additional authentication information, in response to said data complying with said predetermined class.

11. The method of claim 1, wherein said class-based second computer system transmits said user credentials to said first computer system.

12. The method of claim 1, further comprising receiving information relating to said user from a third computer system.

13. A method comprising:
receiving, by a class-based second computer system and from a first computer system for facilitating authentication of a user, authentication information of said user, wherein said authentication information includes at least one of environment information and facility housing information related to said first computer system,
wherein said environment information comprises at least one of characteristics of a process used to initially associate user credentials to said user, characteristics of a process used to verify an identity of said user, and characteristics of a methodology by which a secret is secured, and
wherein said facility housing information comprises at least one of characteristics of physical controls of a facility housing said first computer and characteristics of procedural security controls of said first computer;
determining, by said class-based second computer system, that said authentication information substantially complies with a predetermined class stored by said class-based second computer system, wherein said predetermined class is defined by a service provider; and
providing services by said class-based second computer system, and in response to said determining.

14. The method of claim 13, wherein said first computer system receives information indicative of said identity of said user and authenticates said identity of said user to create authentication information.

15. A class-based second computer system comprising:
a processor for facilitating authentication of a user,
a tangible, non-transitory memory configured to communicate with the processor,
the tangible, non-transitory memory having instructions stored thereon that, in response to execution by the processor, cause the processor to perform operations comprising:
receiving, by said processor and from a first computer system, authentication information of said user, wherein said authentication information includes at least one of environment information and facility housing information related to said first computer system,
wherein said environment information comprises at least one of characteristics of a process used to initially associate user credentials to said user, characteristics of a process used to verify an identity of said user, and characteristics of a methodology by which a secret is secured, and
wherein said facility housing information comprises at least one of characteristics of physical controls of a facility housing said first computer and characteristics of procedural security controls of said first computer;
determining, by said processor, that said authentication information substantially complies with a predetermined class stored by said class-based second computer system, wherein said predetermined class is defined by a service provider; and
providing services, by said processor, and in response to said determining.

16. The method of claim 15, wherein said first computer system receives information indicative of said identity of said user and authenticates said identity of said user to create authentication information.

17. The method of claim 15, wherein said processor transmits a request to said first computer system for additional authentication information, in response to said authentication information complying with said predetermined class.

18. The method of claim 15, wherein said class is at least one of: indicative of information used in authenticating said user, contains data regarding the method of authentication used in performing said authenticating of said user, and contains data regarding security characteristics of said first computing system.

* * * * *